United States Patent
Groendahl et al.

(10) Patent No.: US 11,592,006 B2
(45) Date of Patent: Feb. 28, 2023

(54) WIND TURBINE COMPRISING A GROUNDING SYSTEM FOR TRANSFERRING LIGHTNING CURRENT AND FOR PROVIDING EMF SHIELDING

(71) Applicant: Siemens Gamesa Renewable Energy A/S, Brande (DK)

(72) Inventors: Erik Groendahl, Them (DK); Klaus Wadsholt, Fredericia (DK)

(73) Assignee: SIEMENS GAMESA RENEWABLE ENERGY A/S

(*) Notice: Subject to any disclaimer, the term of this patent is extended or adjusted under 35 U.S.C. 154(b) by 610 days.

(21) Appl. No.: 16/487,123

(22) PCT Filed: Nov. 27, 2017

(86) PCT No.: PCT/EP2017/080441
§ 371 (c)(1),
(2) Date: Aug. 20, 2019

(87) PCT Pub. No.: WO2018/153520
PCT Pub. Date: Aug. 30, 2018

(65) Prior Publication Data
US 2021/0131404 A1   May 6, 2021

(30) Foreign Application Priority Data
Feb. 21, 2017   (DE) .................. 10 2017 202 780.0

(51) Int. Cl.
*F03D 80/30* (2016.01)
*H02K 11/40* (2016.01)
(Continued)

(52) U.S. Cl.
CPC .............. *F03D 80/30* (2016.05); *F03D 9/25* (2016.05); *H02K 7/1838* (2013.01); *H02K 11/40* (2016.01);
(Continued)

(58) Field of Classification Search
CPC ........... F03D 80/30; F03D 9/25; F03D 15/20; H02K 7/1838; H02K 11/40;
(Continued)

(56) References Cited

U.S. PATENT DOCUMENTS

| 7,377,750 B1 | 5/2008 | Costin et al. |
| 2009/0121491 A1 | 5/2009 | Mikkelsen |

(Continued)

FOREIGN PATENT DOCUMENTS

| CN | 201401288 Y | 2/2010 |
| CN | 102652221 A | 8/2012 |

(Continued)

OTHER PUBLICATIONS

Akihiro Ametani et al: "A study of transient magnetic fields in a wind turbine nacelle"; Electromagnetic Compatibility (APEMC), 2010 Asia-Pacific Symposium ON, IEEE, Piscataway, NJ, USA, Apr. 12, 2010 (Apr. 12, 2010), pp. 1201-1204, XP031682884, ISBN: 978-1-4244-5621-5.

(Continued)

*Primary Examiner* — Joseph Ortega
(74) *Attorney, Agent, or Firm* — Schmeiser, Olsen & Watts LLP

(57) ABSTRACT

A wind turbine including a hub to which the rotor blades are arrangeable, wherein the hub is rotatable around a rotating axis is provided. The wind turbine further includes a generator including a rotor arrangement and a stator arrangement, wherein the rotor arrangement and the stator arrangement are rotatable with respect to each other around the rotational axis. Further the rotor arrangement is coupled to the hub. The wind turbine further includes a grounding system which is fixable to a nacelle of the wind turbine, wherein the grounding system is configured for transferring lightning current between the rotor arrangement and the (Continued)

nacelle and for providing an EMF shielding of the generator, wherein the generator is arranged along the rotational axis of the hub between the hub and the grounding system.

9 Claims, 3 Drawing Sheets

(51) Int. Cl.
*H02K 7/18* (2006.01)
*F03D 9/25* (2016.01)
(52) U.S. Cl.
CPC ..... *F05B 2220/706* (2013.01); *F05B 2230/60* (2013.01)
(58) Field of Classification Search
CPC ........... F05B 2220/706; F05B 2230/60; Y02E 10/72; Y02P 70/50
See application file for complete search history.

(56) References Cited

U.S. PATENT DOCUMENTS

| | | |
|---|---|---|
| 2012/0219420 A1 | 8/2012 | Lewke |
| 2012/0269631 A1 | 10/2012 | Lewke |
| 2012/0282097 A1 | 11/2012 | Lewke et al. |
| 2013/0115073 A1 | 5/2013 | Thiel et al. |
| 2014/0348656 A1 | 11/2014 | Huang et al. |
| 2014/0348659 A1 | 11/2014 | Stewart |
| 2015/0167642 A1 | 6/2015 | Hansen |
| 2016/0248292 A1 | 8/2016 | Takarai |
| 2016/0273521 A1 | 9/2016 | Huang et al. |
| 2016/0281687 A1 | 9/2016 | Sogaard et al. |

FOREIGN PATENT DOCUMENTS

| | | | |
|---|---|---|---|
| CN | 102667146 A | 9/2012 | |
| CN | 102767487 A | 11/2012 | |
| CN | 103174603 A | 6/2013 | |
| CN | 103603775 A | 2/2014 | |
| CN | 104364520 A | 2/2015 | |
| CN | 104632548 A | 5/2015 | |
| CN | 205260230 U | 5/2016 | |
| CN | 205277718 U | 6/2016 | |
| CN | 205330882 U | 6/2016 | |
| CN | 105829710 A | 8/2016 | |
| CN | 105916338 A | 8/2016 | |
| EP | 2395238 A1 | 12/2011 | |
| EP | 2520796 A1 | 11/2012 | |
| EP | 2395238 B1 * | 4/2014 | .......... F03D 11/0033 |
| EP | 2889477 A1 | 7/2015 | |
| EP | 2935880 A1 | 10/2015 | |
| JP | 2015127512 A | 7/2015 | |
| WO | 2015051800 A1 | 4/2015 | |

OTHER PUBLICATIONS

International Search Report and Written Opinion dated Mar. 27, 2018 for Application No. PCT/EP2017/080441.
Mon-English Chinese Office Action for Application No. 201780089869.X dated Jun. 1, 2020.
Chinese Office Action for Application No. 201780089869.X, dated Feb. 1, 2021.
Zhang, Junyan et al:; "Wind power plant construction"; 2011.
Chinese Notice of Allowance for Application No. 201780089869.X, dated Jul. 14, 2021.

* cited by examiner

WIND TURBINE COMPRISING A GROUNDING SYSTEM FOR TRANSFERRING LIGHTNING CURRENT AND FOR PROVIDING EMF SHIELDING

CROSS-REFERENCE TO RELATED APPLICATIONS

This application claims priority to PCT Application No. PCT/EP2017/080441, having a filing date of Nov. 27, 2017, which is based off of DE Application No. 10 2017 202 780.0, having a filing date of Feb. 21, 2017, the entire contents both of which are hereby incorporated by reference.

FIELD OF TECHNOLOGY

The following relates to the field of wind turbines equipped with electrical generators and a grounding system for transferring lightning current occurring at the wind turbine. Specifically, the following relates to a grounding system which is capable of transferring the lightning current received at the blades of the wind turbine through, or around the generator of the wind turbine to ground. Further, the following relates to a grounding system which transfers lightning current and simultaneously provides an electromagnetic field (EMF) shielding of the generator of the wind turbine. Furthermore, the following relates to a method for manufacturing a wind turbine comprising a generator and a grounding system for transferring lightning current and providing an EMF shielding.

BACKGROUND

Wind turbines are located offshore or onshore, and are higher than nearby houses or trees for producing electric energy from wind energy. Because of this, the wind turbines are prone to lightning strike because of their height. If the wind turbine is hit by a lightning stroke, the lightning current flows through the blades of the wind turbine and through the generator used for converting wind energy into electric energy. This means that the generator and other electronical parts used in the wind turbine may be damaged due to the lightning current. Furthermore, the lightning current flowing through the wind turbine after a lightning stroke causes an electromagnetic field which can disturb the electromagnetic field of the generator itself or other components external to the generator.

SUMMARY

There may be a need for protecting a generator of a wind turbine of a lightning current and providing an EMF shielding of the generator.

According to a first aspect of embodiments of the invention a wind turbine comprises a hub to which rotor blades are arrangeable, wherein the hub is rotatable around a rotating axis. The wind turbine further comprises a generator comprising a rotor arrangement and a stator arrangement, wherein the rotor arrangement and the stator arrangement are rotatable with respect to each other around the rotational axis. The rotor arrangement is coupled to the hub. Further, the wind turbine comprises a grounding system which is fixable to a nacelle of the wind turbine, wherein the grounding system is configured for transferring lightning current between the rotor arrangement and the nacelle and for providing an EMF shielding of the generator. The generator is arranged along the rotational axis of the hub between the hub and the grounding system.

An aspect of embodiments of the invention relates to the wind turbine being able to transfer a lightning current to ground without damaging the wind turbine. Including in the grounding system is also an EMF shielding function of the generator The lightning current is generally transferred from the blade to the hub and through the generator and/or the nacelle and through a tower of the wind turbine to ground. When being hit by a lightning stroke, the electrical and mechanical parts, in particular the generator, which converts the wind energy into electrical energy, may be damaged. The risk of damage is reduced by equipping the wind turbine with a grounding system which transfers the lightning current to ground.

For instance, in embodiments of the invention a grounding system is arranged at the wind turbine which transfers lightning current between the generator and the wind turbine parts, e.g. a nacelle, without causing damage to the generator. Wind turbines may be retrofitted with such a grounding system for protecting the wind turbines against lightning strokes.

According to an approach of embodiments of the present invention, by arranging the generator of the wind turbine between the hub and the grounding system, the lightning current is transferred from the outside of the generator rotor through the grounding system to the ground. The grounding system can be integrated inside the wind turbine, i.e. inside the nacelle, which will only cause minor design changes. Further, by including the grounding system inside the nacelle, instead of attaching it on the outside, an easier maintenance may be achieved. The included grounding system for transferring lightning current further provides an EMF shielding of the generator. Electromagnetic shielding reduces the electromagnetic field in a determined area by blocking the electromagnetic field with barriers made of conductive or magnetic components. The shielding may reduce the coupling of radio waves, electromagnetic fields and electrostatic fields. This means electromagnetic fields inside the generator can be reduced and also electromagnetic fields outside of the generator, e.g. caused by fields inside the stator of the generator, may be minimized. Therefore, the environmental impact on the generator and from the generator can be reduced.

The generator is used to convert mechanical energy, i.e. wind energy, into electrical energy. In particular, the generator may be a generator for direct drive wind turbines. The generator comprises a stator and a rotor, which both extend circumferentially around a rotational axis of the rotor. A generator used in connection with embodiments of the present invention and which may be equipped with part and/or connections for the grounding system for transferring lightning current, may be a generator of the so called inner stator—outer rotor configuration. According to the inner stator—outer rotor configuration the rotor assembly is located radially outwards with respect to the stator and rotates around the stator assembly. Thereby, in operation, a time varying magnetic flux is caused at the location of the stator, such that an electromagnetic field is generated. In other embodiments of the invention a generator of an outer stator—inner rotor configuration could also be equipped with the grounding system.

The term "rotor arrangement" may particularly denote the rotateable structure of the generator. The rotor arrangement rotates with a rotating shaft around a rotational axis of the generator. The rotor arrangement typically comprises a plurality of magnet elements. In exemplary embodiment of the invention the rotor arrangement is an outer rotor arrangement, such that the rotor arrangement is rotatable around the stator arrangement. Other embodiments of the invention may use an inner rotor arrangement, wherein the rotor arrangement is rotatable inside the stator arrangement. Furthermore, the hub is coupled to the rotating shaft. Other embodiments of the invention may use a generator design having an inner rotating shaft, inside stator, but with outer rotor.

The term "stator arrangement" may particularly denote the stationary structure of the generator. Around the stator arrangement (outer rotor arrangement) or inside the stator arrangement (inner rotor arrangement) the rotor arrangement is rotating. The stator arrangement typically comprises a plurality of coils/windings in which the rotating magnets of the rotor are inducing a voltage. The stator arrangement may be supported by a static shaft, i.e. a stator frame, which is supported by the nacelle.

The grounding system is configured for transferring lightning current and/or for providing an electromagnetic (EMF) shielding. The grounding system is in particular configured for transferring current between the rotor arrangement and robust static parts of the wind turbine, such as a stator frame structure, the nacelle and/or the tower of the wind turbine. The grounding system may comprise a conductive bearing, such as a ball-bearing or a sliding bearing, for transferring the current between the rotor arrangement and a supporting stator frame of the wind turbine. Further, the grounding systems may be configured to conduct the lightning current around the bearing to avoid bearing failures. Furthermore, as described below, the grounding system may comprise a conductive brush element, for example.

According to an approach of embodiments of the present invention, the generator is arranged between the hub and the grounding system such that the generator is faced at one axial end by the hub and at the opposing axial end by the grounding system. In other words, the generator is arranged in between the hub and the grounding system. Hence, the grounding system is arranged at the axial inner end of the generator, which axial inner end is the opposing end with respect to an axial outer end of the generator which faces the hub. Hence, the grounding system transfers the current from the rotor arrangement to the static parts of the wind turbine such as the static shaft, stator frame or the nacelle of the wind turbine. According to a further embodiment of the invention the rotor arrangement of the generator extends between the hub and the grounding system, such that the stator arrangement is housed by the hub, the rotor arrangement and the grounding system.

The term "housed" may particularly denote the hub, the rotor arrangement and the grounding system are forming a housing for the generator. In particular, the generator stator may be encapsulated by the hub and the rotor arrangement on the one side and by the grounding system at the other side. Specifically, the part of the rotor arrangement forming a part of the housing is the outer side of the rotor arrangement. In this embodiment the rotor arrangement is an outer rotor arrangement, such that the outer shell or outer housing of the rotor arrangement is the outer side of the generator. In other words, the generator is surrounded by conductive parts, namely the hub, the outside of the rotor arrangement and the grounding system, such that the conductive parts form a conductive housing (so called Faraday Cage). The conductive housing blocks the electromagnetic field induced by the lightning stroke acting on the generator assembly. The conductive housing reduces the electromagnetic fields inside the generator which will occur due to the lightning current flowing through the wind turbine when the wind turbine is hit by a lightning.

Typically, in wind turbines the hub is connected to the rotor assembly by the rotating shaft. For example, the hub is coupled to the rotating shaft by a bolted connection. The bolted connection and the rotating shaft may be a part of a drive train of the generator, which rotates the rotor arrangement of the generator. On the axial end of the generator facing the hub, the bolted connection of the hub and the rotor arrangement are forming a part of the conductive housing (Faraday cage). The lightning current will be transferred through the blades to the hub further to the bolted connection to the rotor arrangement and from the rotor arrangement through the grounding system to the tower of the wind turbine and to ground.

In another embodiment of the invention an inner rotor arrangement and outer stator arrangement may be used. In this generator configuration the stator arrangement and in particular a stator housing is forming the outer part of the generator. The inner rotor arrangement is coupled to the hub, because the hub is the part which transmits the rotating movement of the hub to the rotor arrangement.

According to a further embodiment of the invention the grounding system comprises a first contact element arrangeable at the rotor arrangement and a second contact element arranged at the nacelle (or to the above mentioned static stator shaft or stator frame), such that a sliding contact between the first contact element and the second contact element is formed.

The term "sliding contact" may particularly denote an electrical contact between the first contact element and the second contact element, wherein the first contact element and the second contact element rotate relative to each other.

By arranging the first contact element at the rotor arrangement and the second contact element at the nacelle or the stator frame, an electrical connection or a conducting line is provided which is able to transfer the lightning current from the rotor arrangement to the nacelle and further to ground. The lightning current is then not transferred through the stator arrangement.

In particular, the first contact element is arranged e.g. at a radially inner surface of the rotor arrangement.

In another embodiment according to the present invention the radial inner side of the rotor arrangement may define the first contact element. The second contact element is slidable along the radial inner side of the rotor arrangement.

The second contact element may be arranged at the stator frame, wherein the stator frame is fixable to the nacelle of the wind turbine. The lightning current may be transferred between the rotor arrangement, i.e. the first contact element, the second contact element and the stator frame and/or the nacelle to ground. The first contact element may be the moving part and the second contact element may be the stationary part of the sliding contact, or vice versa.

According to a further embodiment of the invention the first contact element or the second contact element is a brush. The brush may be made of metal wires and used as a contact element. By using the brush as a sliding contact a reliable electrical contact can be obtained. The brush itself is used as a device which can conduct current between a stationary and a moving parts. The brush may be comprised of graphite and/or copper. If the brush is worn out, the brush can be easily replaced by a new brush at service intervals.

According to a further embodiment of the invention the first contact element or the second contact element is a (conductive, metal) mesh element. The mesh is used to conduct the lightning current to the stator frame, the nacelle and/or to the tower of the wind turbine, such that the lightning current is transferred to ground. By using a metal mesh, the electromagnetic shielding is provided. The damping factor of the electromagnetic field and/or the specific frequency of the electromagnetic waves depend also on the thickness, the size and the volume of the used mesh material. In particular, the size and density of the mesh openings may be predefined, in order to adjust the damping characteristic of the specific frequency of the electromagnetic waves.

According to the exemplary embodiment of the invention the first contact element mounted to the rotor arrangement is a brush and the second contact element mounted to the nacelle and the stator frame, respectively, is a mesh element. The brush is in sliding contact with the mesh arranged at the stator frame or the nacelle.

In another exemplary embodiment, the brush forms part of the second contact element, wherein the first contact element is formed by the radial inner side of the rotor arrangement. Further, the second contact element may comprise the brush and the mesh element. In this configuration the brush element of the second contact element is directly in sliding contact with the radial inner side of rotor arrangement According to a further exemplary embodiment, the first contact element is the mesh element and the second contact element is the brush. Further, the first contact element may comprise the brush and the mesh element, wherein the second contact element may be a part of the stator frame or the nacelle. In this configuration the sliding contact may be provided between the brush and the stator frame (or the nacelle) itself.

According to a further embodiment of the invention, the mesh element comprises conducting wires which are spaced apart such that they are forming mesh holes. The mesh comprises a plurality of conducting wires, in particular a plurality of metal wires. The conducting wires are arranged with a predetermined distance such that they are spaced apart. In particular a first plurality of the conducting wires are arranged in parallel and simultaneously a second plurality of the conducting wires are arranged such that they intersecting each other. By this arrangement the holes between the conducting wires are formed.

The mesh is used to conduct the lightning current and to reduce the radiating electromagnetic field from the stator. Depending on which frequencies have to be reduced a predetermined hole size has to be used.

For reducing specific electromagnetic wavelengths the holes in the mesh have to be smaller than the wavelength which has to be reduced.

According to a further embodiment of the invention, the grounding system comprises a metal ring attached to the first contact element or the second contact element. The metal ring may be used as a contact element which provides a surface to which another part of the contact element may be attached. The metal ring may be used to attach the brush and/or the mesh thereon. On the other hand the metal ring may provide a surface for forming an appropriate sliding surface for the sliding contact. The metal ring may be fixable to the first or the second contact element. For example, if the brush is the first contact element, the metal ring may be fixed at the second contact element comprising e.g. the mesh, such that the brush is in sliding contact with the metal ring at the mesh.

Furthermore, the metal ring may provide a contact between the first element and the rotor arrangement, wherein the metal ring may be attached to the radial inner side of the rotor arrangement, such that an attaching surface for the first contact element (the brush or the mesh) is provided.

According to a further embodiment of the invention the first contact element or the second contact element comprises a brush arrangement extending in circumferential direction around the rotational axis, wherein the brush arrangement comprises spaced apart brush groups which forming a sliding contact.

The brush arrangement may comprise brushes arranged adjacent to each other, wherein the brushes are forming a continuously brush ring. In other words, the first contact element may be a brush ring extending circumferentially around the rotational axis and attached to the rotor arrangement. Also the second contact element may be a brush ring in an exemplary embodiment.

The brush arrangement may comprise brushes spaced apart from each other, wherein the brush arrangement comprises at least to brushes. Furthermore, the brush arrangement may comprise a plurality of brush groups, wherein one brush group comprises at least one brush (or also more than one brush). The brush group may be arranged circumferentially spaced apart in a determined distance. The distance may be equal between each spaced apart brush (or brush group). Furthermore, the brush groups may be arranged in such a way that at least one brush group of the plurality of brush groups is providing an electrical contact for transferring the lightning current.

According to a further aspect of embodiments of the invention there is provided a method for manufacturing a wind turbine. The method comprises arranging rotor blades at a hub, wherein the hub is rotatable around a rotating axis. Further, the method comprises arranging a generator comprising a rotor arrangement and a stator arrangement, wherein the rotor arrangement and the stator arrangement are rotatable with respect to each other around the rotational axis. The method further comprises coupling the rotor arrangement to the hub and fixing a grounding system to a nacelle of the wind turbine. The grounding system is configured for transferring lightning current between the rotor arrangement and the nacelle and for providing an EMF shielding of the generator. Furthermore, the method comprises arranging the generator along the rotational axis of the hub between the hub and the grounding system.

If the wind turbine is equipped with a grounding system for transferring lightning current between a rotor arrangement and a nacelle the electronical part, in particular the generator, may be protected from being damaged by the lightning current. Therefore, the operation of the wind turbine and the performance of the generator may be maintained. In particular by arranging the generator between the hub of the wind turbine and the grounding system, the lightning current is transferred on the outer surface of the generator to ground and not through the generator itself.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
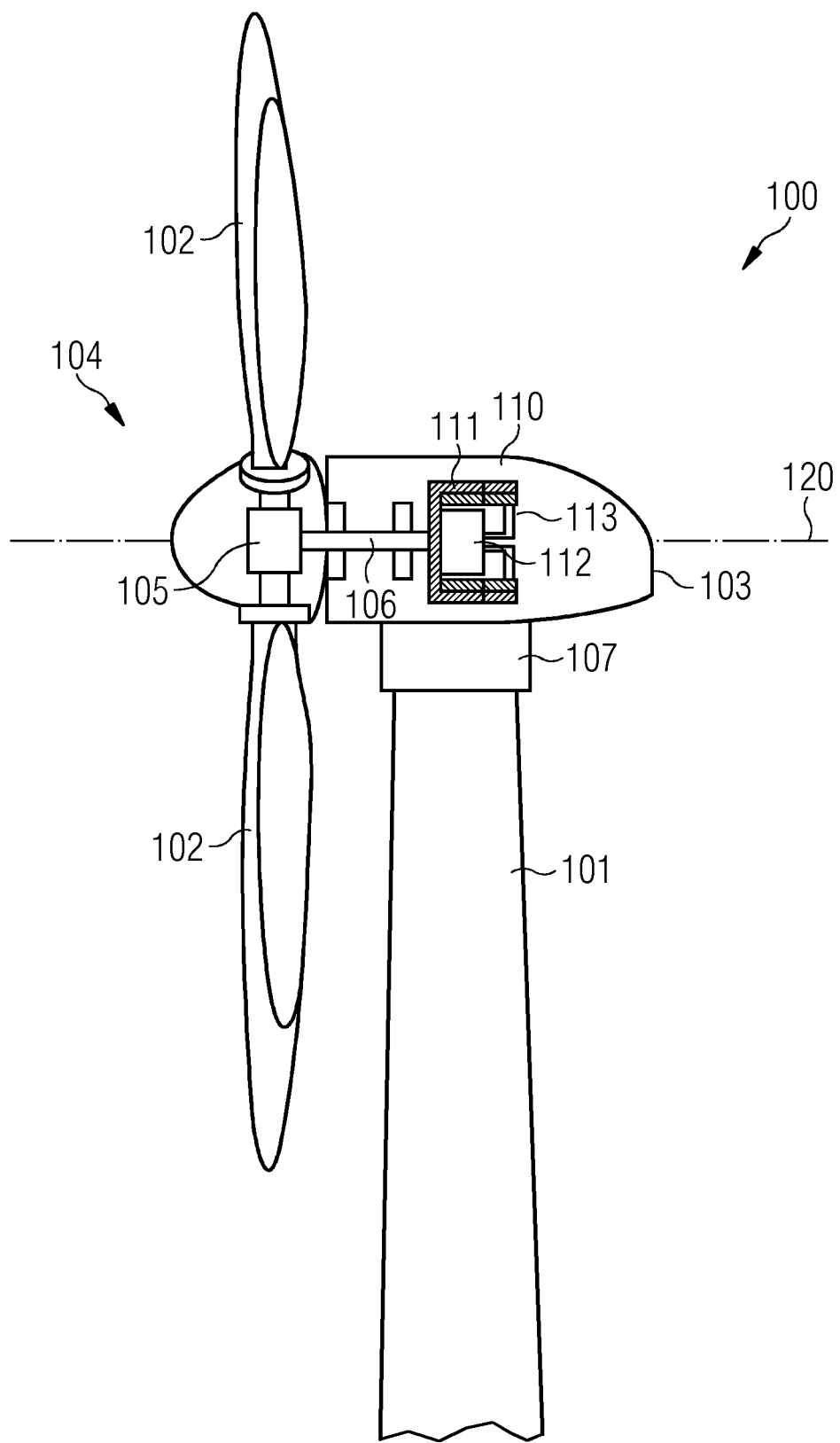
FIG. 1 depicts a side view of a wind turbine equipped with a generator and a grounding system according to an exemplary embodiment of the invention.

The illustration in the drawing is schematical. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

Further, spatially relative terms, such as "front" and "back", "above" and "below", "left" and "right", et cetera are used to describe an element's relationship to another element(s) as illustrated in the figures. Thus, the spatially relative terms may apply to orientations in use which differ from the orientation depicted in the figures. Obviously all such spatially relative terms refer to the orientation shown in the figures only for ease of description and are not necessarily limiting as an apparatus according to an embodiment of the invention can assume orientations different than those illustrated in the figures when in use.

FIG. 1 depicts a side view of a wind turbine 100 according to an exemplary embodiment of the invention. The wind turbine 100 comprises a tower 101, which is mounted on a non-depicted fundament. On top of the tower 101 there is arranged a nacelle 103. In between the nacelle 103 and the tower 101 there is provided a yaw angle adjustment device 107, which is capable of rotating the nacelle 103 around a not depicted vertical axis, which is aligned with the longitudinal extension of the tower 101. The wind turbine 100 further comprises a wind rotor 104 having for example three blades 102. The wind rotor 104 is rotatable around a rotational axis 120. The blades 102 which are mounted to a hub 105 extend radially with respect to the rotational axis 120. The rotational axis 120 forms a rotating axis of a generator 110, in particular of a rotor arrangement 112.

In the nacelle 103 there is arranged an electric generator 110. The electric generator 110 comprises a stator arrangement 112 and a rotor arrangement 111 The wind rotor 104 is rotationally coupled with the rotor arrangement 111 by means of the hub 105 and a drive train 106.

According to the shown embodiment, the electric generator 110 is realized with a so called inner stator arrangement 112 and outer rotor arrangement 111 configuration. The wind turbine 100 is further equipped with a grounding system 113 for transferring lightning current through the wind turbine 100 and for providing an EMF shielding of the generator. The grounding system 113 is arranged in the nacelle 103 of the wind turbine 100. The lightning current is transferred between the rotor arrangement 111 and the nacelle 103. As can be seen from FIG. 1, the generator 110 is arranged along the rotational axis 120 of the hub 105 between the hub 105 and the grounding system 113.

It is further mentioned that the wind turbine 100 is a so called direct drive wind turbine wherein between the wind rotor 104 and the rotor arrangement 111 at the generator 110 there is not provided a gear box. However, it is mentioned that the electric generator 110 could also be driven indirectly via a gear box.

Figure 2:
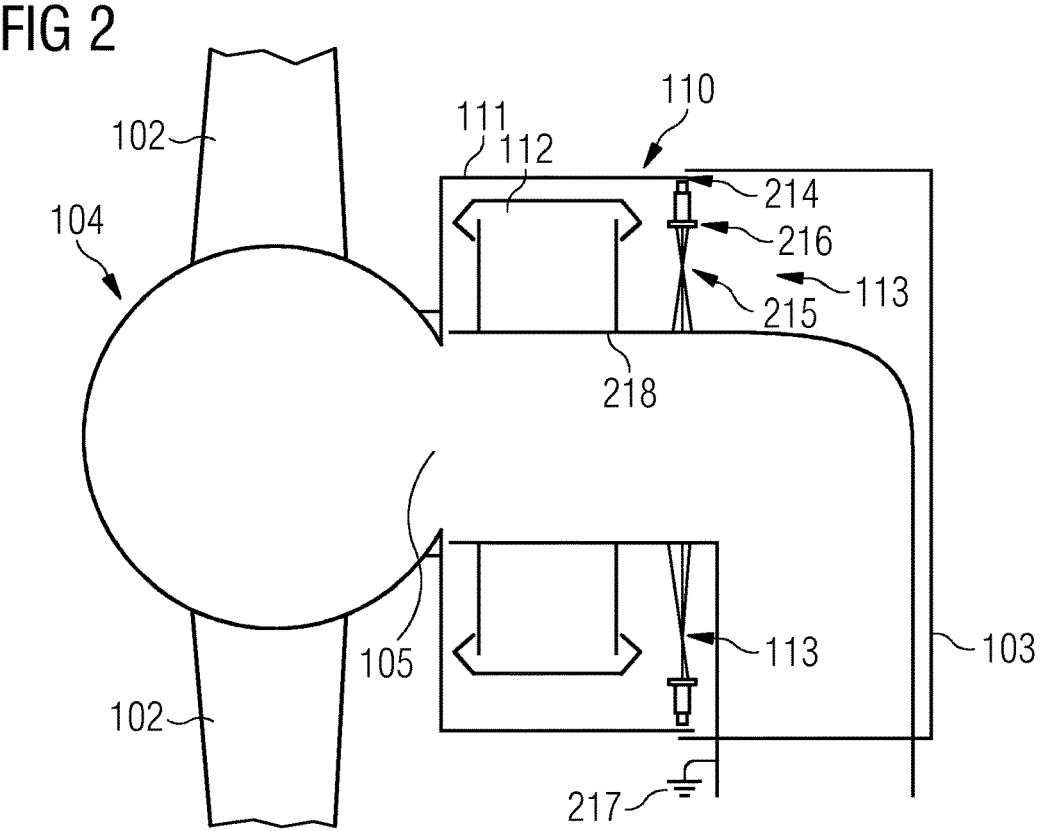
FIG. 2 depicts a sectional view of a wind turbine equipped with a generator and a grounding system according to an exemplary embodiment of the invention.

FIG. 2 depicts a sectional of a wind turbine 100 comprising the grounding system 113 according to an exemplary embodiment of the invention. The wind rotor 104 and the generator 110 are shown schematically. As can be seen from FIG. 2, the rotor arrangement 111 extends between the hub 105 and the grounding system 113, such that the stator arrangement 112 is housed by the hub 105, the rotor arrangement 111 and the grounding system 113. The grounding system 113 arranged in the wind turbine 100 comprises a first contact element 214 coupled to the rotor arrangement 111 and a second contact element 215 coupled to the nacelle 103. A sliding contact between the first contact element 214 and the second contact element 215 is formed. As can be seen in FIG. 2, the second contact element 215 is fixed to a stator frame 218 and comprises a brush and a mesh element 215. The first contact element 214 in FIG. 2 is formed by the radial inner side of the rotor arrangement 111 itself. Therefore, the sliding contact is provided between the rotor arrangement 111 and the second contact element 215 which is in particular the brush arranged at the radial outer end of the mesh element. The second contact element 215 according to this embodiment further comprises a metal ring 216 which is arranged between the brush and the mesh element. The lightning current is transferred from the hub 105 to the rotor arrangement 111 via the sliding contact to the brush, the metal ring 216, the mesh element to the stator frame 218 and then further to ground 217.

As can be seen in FIG. 2, the main parts of the generator 110, such as the stator arrangement 112 and e.g. radial inner parts of the rotor arrangement 111 are housed by the hub 105 and the rotor arrangement 111 on the one axial end and by the grounding system 113 on the other axial end. The axial inner end of the stator arrangement 112 is called the non-drive end to which the grounding system 113 is attached.

Hence, a Faraday cage is formed which houses the stator arrangement 112. The Faraday cage is formed by the hub 105, the rotor arrangement 111, in particular the radial outer side of the rotor arrangement 111, and the grounding system 113, such that an electromagnetic field from the lightning current can be reduced and an electromagnetic field radiating form the stator arrangement 112 can be minimized.

As can be seen in FIG. 2 the outer rotor arrangement 111 extends from a first axial end of the stator arrangement 112 to an opposing second axial end of the stator arrangement 112. Furthermore, the rotor arrangement 111 overlaps the second axial end of the stator arrangement 112. The grounding system 113 is coupled to the overlapping section of the rotor arrangement 111.

Furthermore, as can be seen in FIG. 2 the conductive connection from the blades 102, to the hub 105 and to the ground 217 is illustrated schematically. Before the lightning current is transferred to ground 217 the lightning current is transferred via the hub 105, the rotor arrangement 111 though the grounding system 113 and from the grounding system 113 to the stator frame 218, the nacelle 103 (or parts of the nacelle 103) and finally to the tower.

Figure 3:
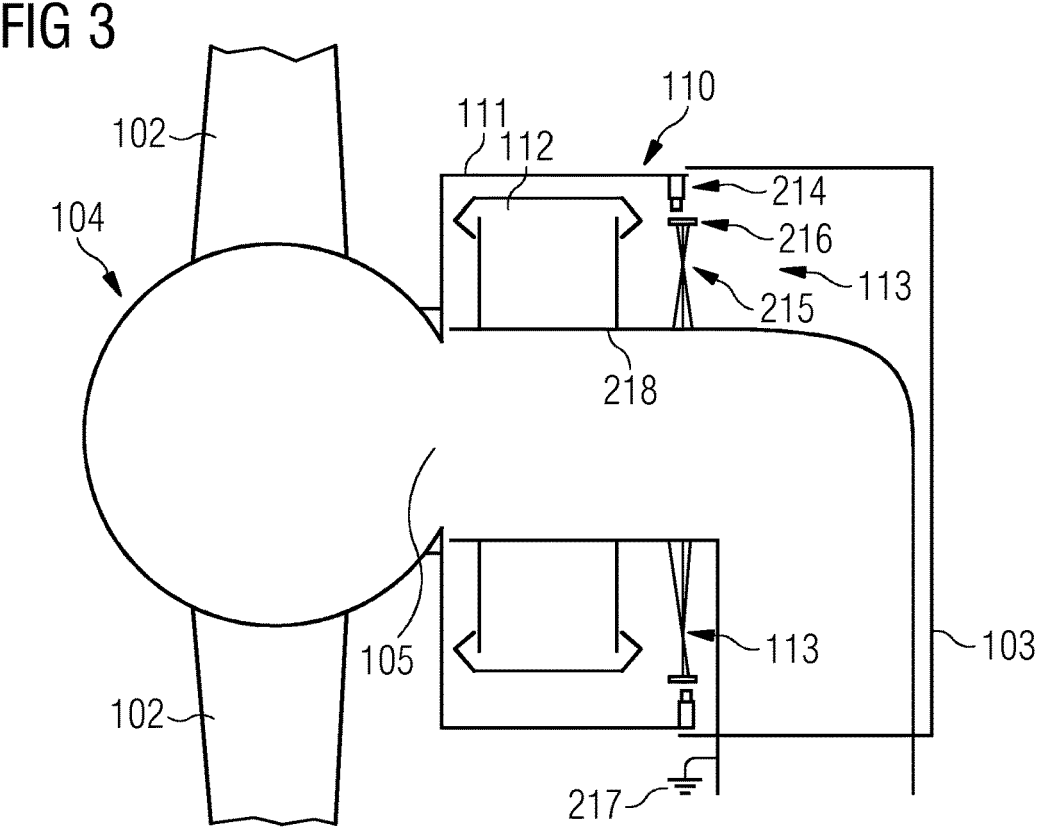
FIG. 3 depicts a sectional view of a wind turbine equipped with a generator and a grounding system according to another exemplary embodiment of the invention.

FIG. 3 depicts a sectional of a wind turbine 100 comprising the grounding system 113 according to another exemplary embodiment of the invention. The wind rotor 104 and the generator 110 are also shown schematically. As can be seen from FIG. 3, the rotor arrangement 111 extends between the hub 105 and the grounding system 113, such that the stator arrangement 112 is housed by the hub 105, the rotor arrangement 111 and the grounding system 113. The grounding system 113 arranged in the wind turbine 100 comprises a first contact element 214 which is arranged at the rotor arrangement 111 and a second contact element 215 which is arranged at the nacelle. The first contact element 214 comprises the brush and the second contact element 215 comprises the mesh element. The brush 214 is arranged at the rotor arrangement 111. In particular, the brush 214 is arranged at the radial inner side of the rotor arrangement 111. At the mesh 215, there may be attached a metal ring 216, such that the metal ring 216 is arranged between the brush 214 and the mesh element 215. By arranging the metal ring 216 at the mesh element 215, the brush can slide along the metal ring 216 for forming the sliding electrically conductive contact.

Figure 4:
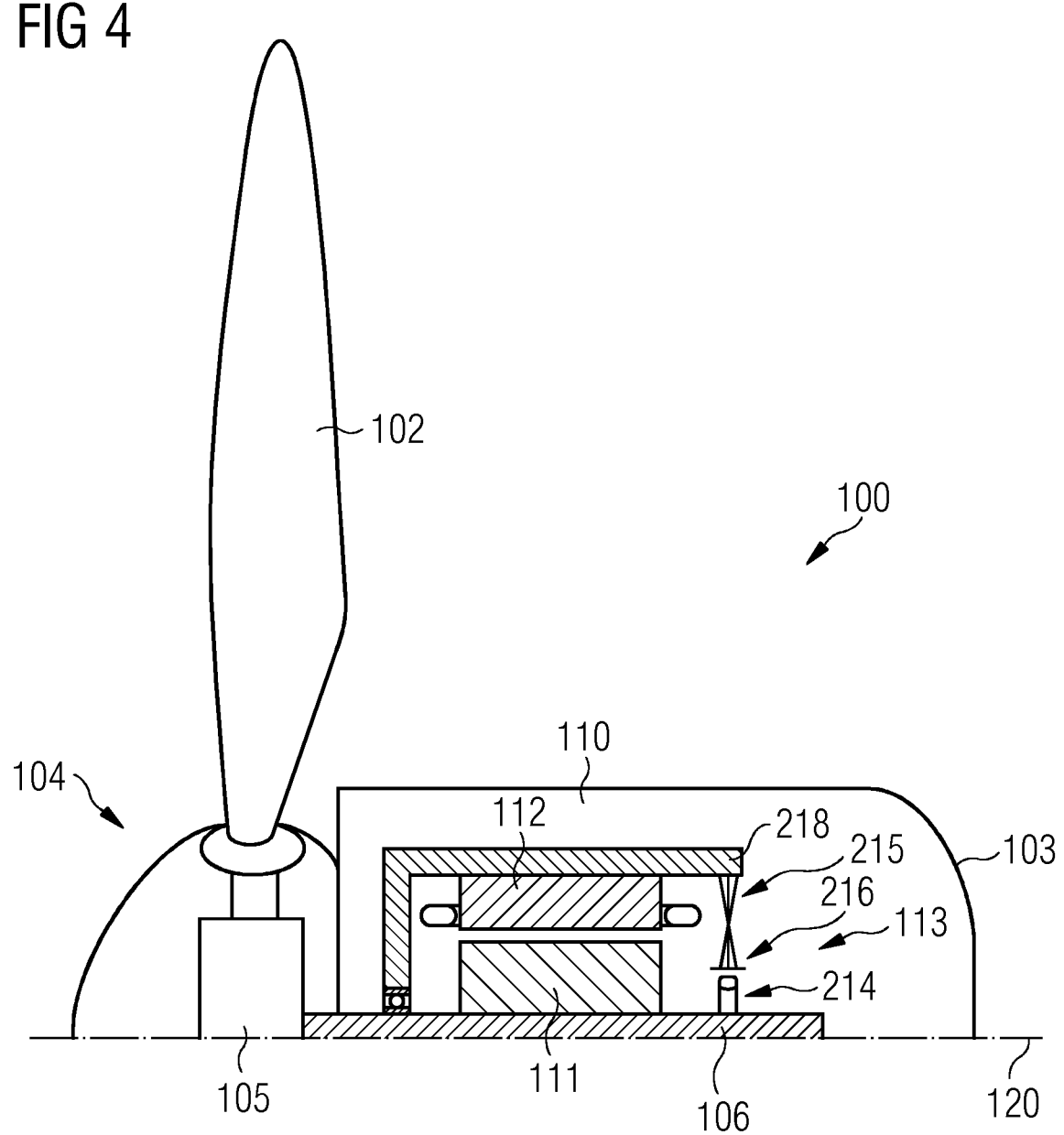
FIG. 4 depicts a sectional view of a wind turbine in an outer stator inner rotor configuration according to an exemplary embodiment of the invention.

FIG. 4 depicts a sectional view of a wind turbine in an outer stator inner rotor configuration according to an exemplary embodiment of the invention. In this embodiment, a generator inside a nacelle 103 comprising an outer stator arrangement 112 and an inner rotor arrangement 111 is shown. The rotor arrangement 111 is connected to the hub 105 via a shaft of a drive train 106 such that the rotor arrangement 111 is rotatable inside the stator arrangement 112. The stator arrangement 112 comprises a stator frame 218, wherein at the stator frame 218 the grounding system 113 for transferring lightning current and for providing an EMF shielding is attached. The stator frame 218 is attached to the nacelle 103. The generator 110 does also extend between the hub 115 and the grounding system 113. As can be seen in FIG. 4, the stator and the rotor arrangement 111, 112 are housed by the stator frame 218, by the hub 105 at the one axial end and by the grounding system 113 at other axial end. The grounding system 113 arranged in the wind turbine 100 comprises a first contact element 214 which is arranged at the rotor arrangement 111 and a second contact element 215 which is arranged at the stator frame 218. The first contact element 214 according to this embodiment is the brush and the second contact element 215 is only the mesh element. At the mesh 215 there may be attached a metal ring 216, such that the metal ring 216 is arranged between the brush 214 and the mesh element 215. In the outer stator inner rotor arrangement the second contact element may comprise the brush and the mesh element.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine comprising
a hub to which rotor blades are arrangeable,
wherein the hub is rotatable around a rotating axis,
a generator comprising a rotor arrangement and a stator arrangement, wherein the rotor arrangement and the stator arrangement are rotatable with respect to each other around the rotational axis,
wherein the rotor arrangement is coupled to the hub, and
a grounding system having a first contact element and a second contact element,
wherein the grounding system is configured for transferring lightning current between the rotor arrangement and the nacelle and for providing an EMF shielding of the generator,
wherein the generator is arranged along the rotational axis of the hub between the hub and the grounding system, and
wherein the first contact element and the second contact element are integrated inside the nacelle.

2. The wind turbine according to claim 1,
wherein the rotor arrangement of the generator extends between the hub and the grounding system, such that the stator arrangement is housed by the hub, the rotor arrangement and the grounding system.

3. The wind turbine according to claim 1,
wherein the first contact element is arrangeable at the rotor arrangement and the second contact element is arranged at the nacelle, such that sliding contact is provided between the first contact element and the second contact element.

4. The wind turbine according to claim 3,
wherein the first contact element or the second contact element is a brush.

5. The wind turbine according to claim 3, wherein
the grounding system comprises a metal ring attached to the first contact element or the second contact element.

6. The wind turbine according to claim 3, wherein
the first contact element or the second contact element is a brush arrangement extending in circumferential direction around the rotational axis,
wherein the brush arrangement comprises spaced apart brush groups which forming a slide contact.

7. The wind turbine according to claim 3, wherein
the first contact element or the second contact element is a mesh element.

8. The wind turbine according to claim 7, wherein the mesh element comprises conducting wires which are spaced apart such that they form mesh holes.

9. A method for manufacturing a wind turbine, the method comprising:
arranging rotor blades at a hub,
wherein the hub is rotatable around a rotating axis,
arranging a generator comprising a rotor arrangement and a stator arrangement, wherein the rotor arrangement and the stator arrangement are rotatable with respect to each other around the rotational axis,
coupling the rotor arrangement to the hub, and
fixing a grounding system having a first contact element and a second contact element to a nacelle of the wind turbine, wherein the grounding system is integrated inside the nacelle and wherein the grounding system is configured for transferring lightning current between the rotor arrangement and the nacelle and for providing an EMF shielding of the generator, and
arranging the generator along the rotational axis of the hub between the hub and the grounding system.

* * * * *